United States Patent
Holden et al.

(10) Patent No.: US 8,991,841 B2
(45) Date of Patent: Mar. 31, 2015

(54) AIR SPRING, AIR STRUT AND AIR SUSPENSION SYSTEM WITH A LINEARIZED SPRING RATE

(71) Applicant: MSI Defense Solutions, LLC, Mooresville, NC (US)

(72) Inventors: David J. Holden, Davidson, NC (US); Andrew M. Wizorek, Davidson, NC (US); Todd J. Holbert, Kernersville, NC (US)

(73) Assignee: MSI Defense Solutions, LLC, Mooresville, NC (US)

( * ) Notice: Subject to any disclaimer, the term of this patent is extended or adjusted under 35 U.S.C. 154(b) by 0 days.

(21) Appl. No.: 14/016,618

(22) Filed: Sep. 3, 2013

(65) Prior Publication Data

US 2014/0062040 A1    Mar. 6, 2014

Related U.S. Application Data

(60) Provisional application No. 61/696,581, filed on Sep. 4, 2012.

(51) Int. Cl.
*B60G 11/27* (2006.01)
*B60G 17/052* (2006.01)
*F16F 9/02* (2006.01)
(Continued)

(52) U.S. Cl.
CPC .............. *B60G 11/27* (2013.01); *B60G 15/12* (2013.01); *B60G 17/052* (2013.01); *B60G 2202/152* (2013.01); *F16F 9/0236* (2013.01)
USPC ............ 280/124.16; 188/322.15; 188/322.22; 267/64.15; 267/64.26; 280/5.514; 280/5.515; 280/6.157; 280/6.159; 280/124.157

(58) Field of Classification Search
CPC ............. B60G 17/0155; B60G 17/052; B60G 17/0523; B60G 17/0525; B60G 11/27; B60G 2202/152; B60G 2500/30; F16F 9/0209; F16F 9/0227; F16F 9/3214; F16F 9/34; F16F 9/3405; F16F 9/512; F16F 9/5123; F16F 9/5126
USPC ........ 188/322.13–322.15, 322.22; 267/64.11, 267/64.15, 64.25, 64.26, 64.28; 280/5.514, 280/5.515, 6.157, 6.159, 124.157, 124.16
See application file for complete search history.

(56) References Cited

U.S. PATENT DOCUMENTS

| | | |
|---|---|---|
| 2,879,057 A | 3/1959 | Heiss |
| 3,127,158 A | 3/1964 | Broadwell |

(Continued)

OTHER PUBLICATIONS

International Search Authority, "International Search Report and Written Opinion," PCT/US13/057914, mailed Sep. 4, 2013.

*Primary Examiner* — Ruth Ilan
*Assistant Examiner* — Laura Freedman
(74) *Attorney, Agent, or Firm* — Jeffrey Watson; Balser & Grell IP Law

(57) ABSTRACT

An air spring that can be used in an air suspension system includes a hollow piston, a hollow shaft and a body. The hollow piston has a hole through it. The hollow shaft has a shaft interior volume in communication with the hole in the piston. The body has a body interior volume in communication with the hole in the hollow piston. The hole in the hollow piston in communication with the shaft interior volume and the body interior volume provides a total interior volume. Wherein, the total interior volume is greater than the body interior volume thereby providing a linearized spring rate.

12 Claims, 11 Drawing Sheets

(51) Int. Cl.
 *F16F 9/34* (2006.01)
 *F16F 9/512* (2006.01)
 *B60G 15/12* (2006.01)

(56) References Cited

U.S. PATENT DOCUMENTS

| | | | |
|---|---|---|---|
| 4,159,105 A * | 6/1979 | Vander Laan et al. | 267/218 |
| 4,503,951 A * | 3/1985 | Imaizumi | 188/280 |
| 4,506,869 A * | 3/1985 | Masclet et al. | 267/64.15 |
| 4,598,929 A | 7/1986 | Kumagai et al. | |
| 4,660,688 A | 4/1987 | Spisak et al. | |
| 4,934,667 A | 6/1990 | Pees et al. | |
| 5,046,755 A * | 9/1991 | Runkel et al. | 280/124.101 |
| 5,509,675 A | 4/1996 | Barnett | |
| 6,105,988 A | 8/2000 | Turner et al. | |
| 6,360,857 B1 | 3/2002 | Fox et al. | |
| 6,669,179 B2 * | 12/2003 | Dohrmann | 267/139 |
| 6,981,578 B2 * | 1/2006 | Leiphart et al. | 188/322.14 |
| 7,441,789 B2 * | 10/2008 | Geiger et al. | 280/124.16 |
| 8,123,006 B1 | 2/2012 | Schroeder | |
| 2008/0073096 A1 | 3/2008 | Berger et al. | |
| 2009/0236807 A1 | 9/2009 | Wooten et al. | |
| 2011/0101579 A1 | 5/2011 | Polakowski et al. | |
| 2011/0187076 A1 | 8/2011 | Gonzalez et al. | |
| 2011/0215551 A1 * | 9/2011 | Galasso et al. | 280/276 |
| 2012/0181767 A1 | 7/2012 | Kondo et al. | |

* cited by examiner

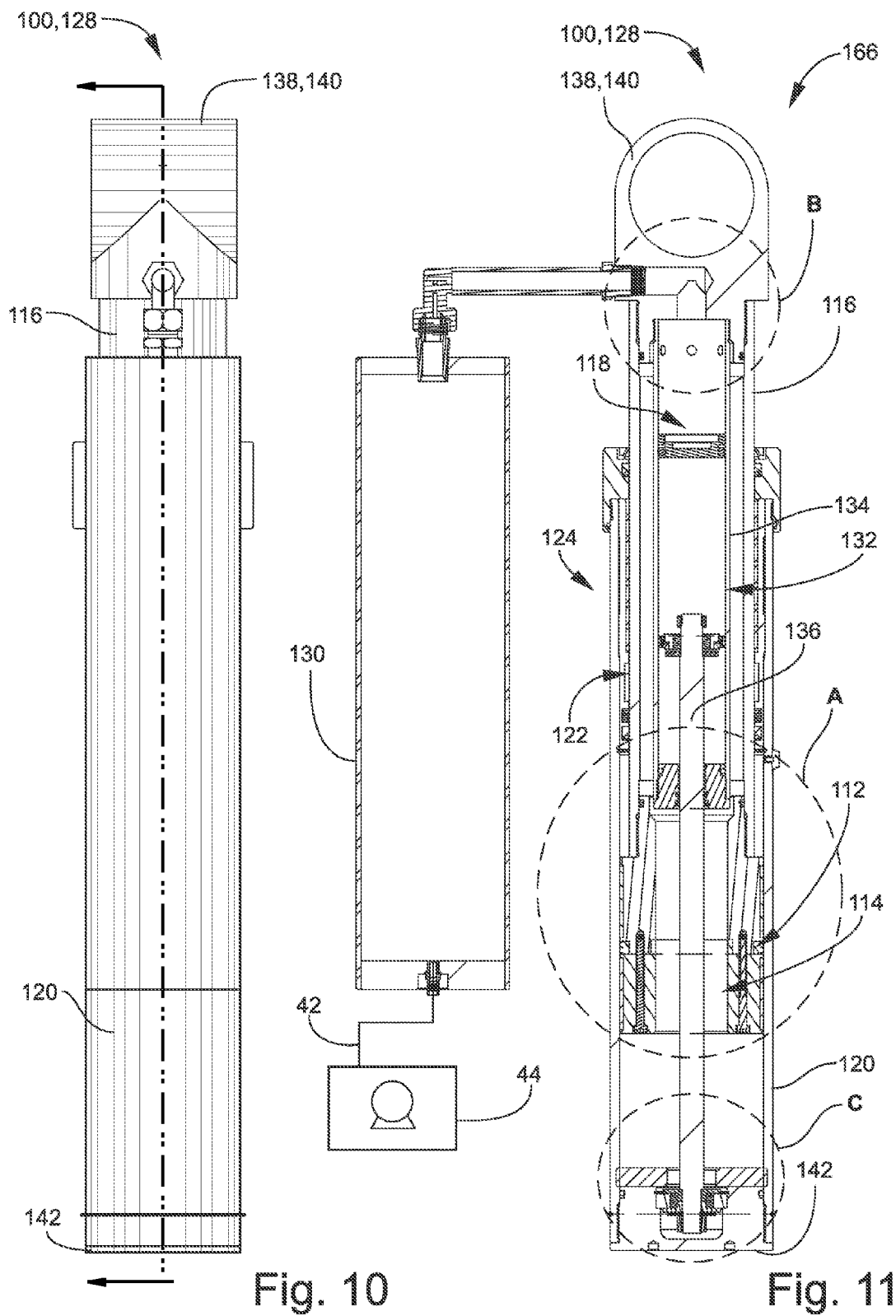

AIR SPRING, AIR STRUT AND AIR SUSPENSION SYSTEM WITH A LINEARIZED SPRING RATE

CROSS-REFERENCE TO RELATED APPLICATIONS

This application claims priority to U.S. Provisional Patent Application Ser. No. 61/696,581, filed Sep. 4, 2012, which is incorporated herein by reference in its entirety.

FIELD OF INVENTION

The present invention generally relates to air springs, air struts and air suspension systems, and more particularly to an air spring with a more linear spring rate, an air strut incorporating the concepts of such an air spring, and an air suspension system including such an air spring, such an air strut, or combinations thereof.

BACKGROUND OF THE INVENTION

An air spring, also known as an air bag or an air bellow, is a type of vehicle suspension powered by an electric or engine driven air pump or compressor. This pump pressurizes the air, using compressed air as a spring. Air suspension is often used in place of conventional steel springs, and in heavy vehicle applications such as buses and trucks. The purpose of air suspension is to provide a smooth, constant ride quality and in most cases it is self-leveling. Air pressure rises the spring and in turn raises the chassis from the axle.

One problem associated with known air springs is that the spring rate is not linear and exponentially grows as the spring compresses. Spring Rate is the amount of weight needed to compress a spring a certain distance. Springs are typically rated in LB/in (in metric system kg/mm), or specifically, how many pounds of weight are required to depress the spring by one inch. Consider you have 2 springs having different spring rates: one with 500 g/mm and the other with 750 g/mm. This means the 1st spring will compress 1 mm if you put a load of 500 grams, while the 2nd one will not. The 2nd one will need a 750 gram load to compress 1 mm. The common description of air springs is to say that the 2nd spring is harder than the 1st one, or that the springs that have a low spring rate are soft, while springs that have a high spring rate are stiff. If there are two different values listed for the spring rate of a spring, it means that the spring starts at one rate, and ends at another rate under full compression. This is associated with the air spring rate being non-linear and growing exponentially as the spring compresses.

A typical air spring has a relatively non-linear spring rate. See FIG. 1. This means that the force required to compress the air spring the first few inches of compression displacement is relatively the same, i.e. the spring rate remains pretty constant (between 500 lb/in and 1000 lb/in for the first 4 inches of compression displacement in FIG. 1). Then, the force required to compress the spring grows exponentially the remaining distance of compression displacement (grows from 1,000 lb/in to 12,000 lb/in for the compression displacement of 4 to 8 inches in FIG. 1). This non-linear spring rate provided by standard air springs is not desired as it varies the ride of the vehicle under different loads. This is especially problematic for vehicles required to carry heavier loads like commercial and military vehicles, where the vehicle is carrying no loads in some instances, small loads in other instances, and larger heavy loads in other instances.

A strut used in the suspension of a vehicle is commonly known as the MacPherson strut, which is a type of car suspension system which uses the axis of a telescopic damper as the upper steering pivot. It is widely used in modern vehicles and named after Earle S. MacPherson, who developed the design. MacPherson struts typically consist of a wishbone or a substantial compression link stabilized by a secondary link which provides a bottom mounting point for the hub or axle of the wheel, which provides both lateral and longitudinal forces on the wheel. The upper part of the hub is rigidly fixed to the inner part of the strut proper, the outer part of which extends upwards directly to a mounting in the body shell of the vehicle. The strut also usually has a steering arm built into the lower inner portion. The strut will usually carry both the coil spring on which the body is suspended and the shock absorber, which is usually in the form of a cartridge mounted within the strut. The whole assembly is very simple and can be preassembled into a unit, is relatively inexpensive and thus has been around and used frequently since its creation. However, there are no known air springs that can function as such Macpherson struts.

The instant invention is designed to address the above mentioned problems by providing an air spring, air strut and air suspension system with a more linear spring rate.

SUMMARY OF THE INVENTION

The instant invention is directed toward an air spring, air strut and air suspension system using such air springs and air struts that provides a linearized spring rate. The air spring may include a hollow spring piston, a hollow spring shaft and a spring body. The hollow spring piston may have a spring hole through it. The hollow spring shaft may have a spring shaft interior volume in communication with the spring hole in the spring piston. The spring body may have a spring body interior volume in communication with the spring hole in the hollow spring piston. The spring hole in the hollow spring piston in communication with the spring shaft interior volume and the spring body interior volume may provide a total spring interior volume. Wherein, the total spring interior volume may be greater than the spring body interior volume thereby providing a linearized spring rate.

The air strut with a linearized spring rate includes a hollow air strut piston, a hollow strut shaft, and a strut body. The hollow air strut piston has a strut hole through it. The hollow strut shaft may have a strut shaft interior volume in communication with the strut hole in the strut piston. The strut body may have a strut body interior volume in communication with the strut hole in the hollow strut piston. The strut hole in the hollow strut piston in communication with the strut shaft interior volume and the strut body interior volume may provide a total strut interior volume. Wherein, the total strut interior volume may be greater than the strut body interior volume thereby providing a linearized spring rate.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 10 is a side view of an air strut according to at least one embodiment of the instant invention.

FIG. 11 is a cross-sectional view of the air strut from FIG. 10.

DETAILED DESCRIPTION OF THE INVENTION

Figure 1:
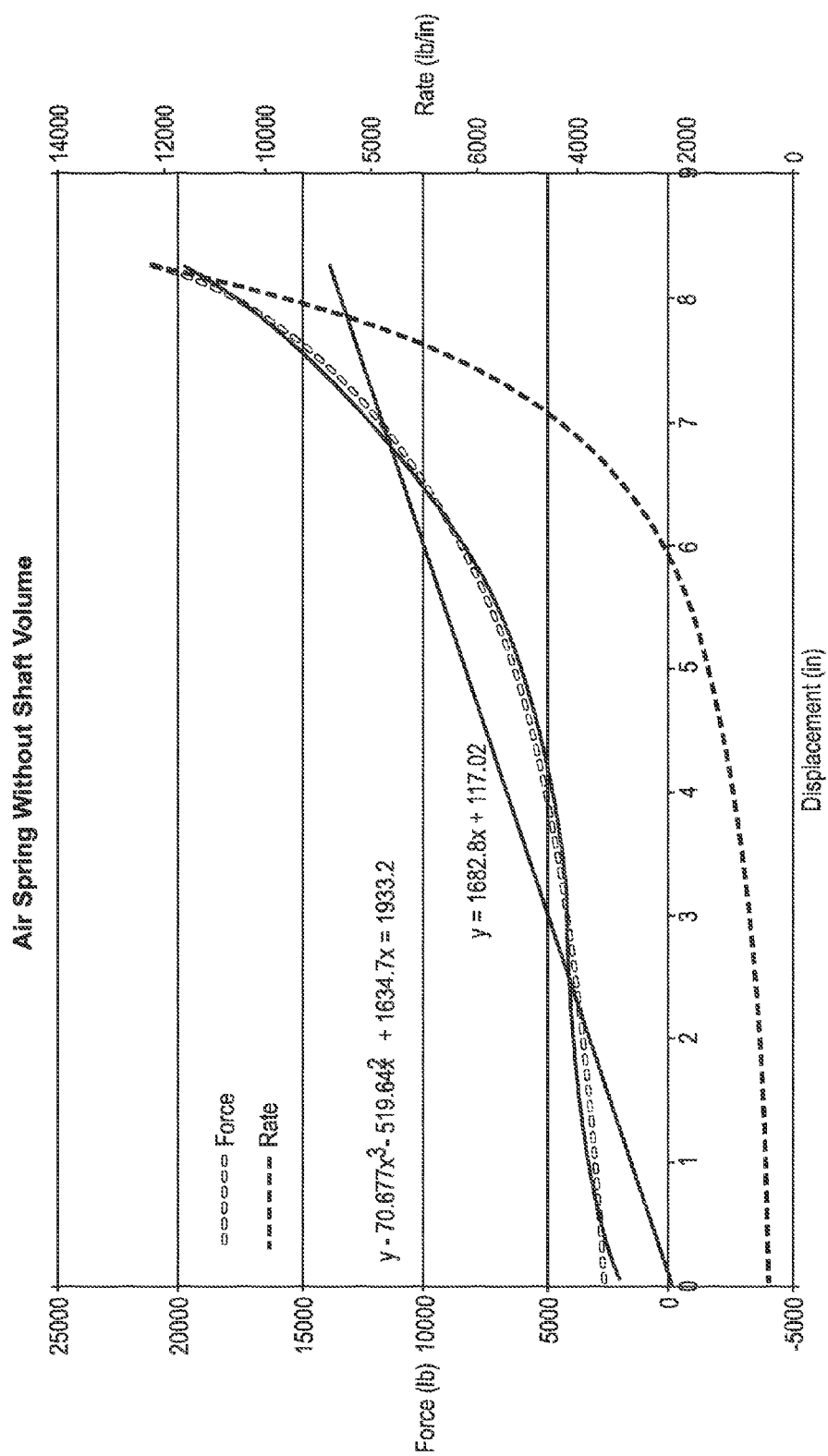
FIG. 1 is a graph of the spring rate of a prior art air spring in force versus displacement.

Referring to the drawings, wherein like numerals, indicate like elements, there is shown in FIGS. 1-15 select embodiments of an air spring 10 for an air spring suspension system 50, and an air strut 100 for an air strut suspension system 166. The air spring 10 and/or air strut 100 of the instant invention are designed to have a more linear spring rate than standard air springs or air struts, i.e. the air spring 10 and/or air strut 100 provide a linearized spring rate 26, 126, respectively. See FIG. 2. In addition, the air strut 100 is designed to act as a MacPherson strut 128.

Figure 2:
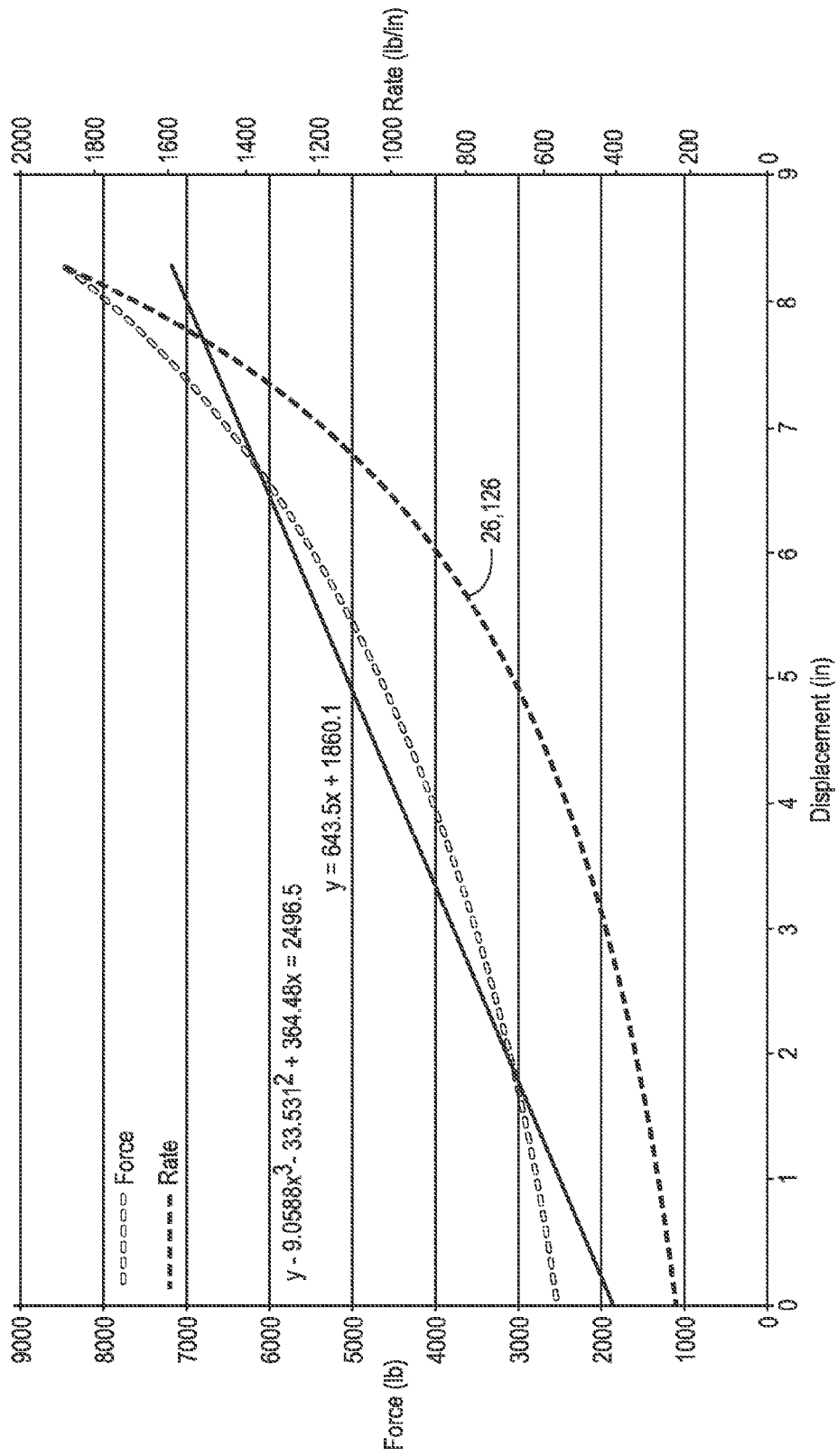
FIG. 2 is a graph of the spring rate of an air spring according to at least one embodiment of the instant invention in force versus displacement.
Figure 3:
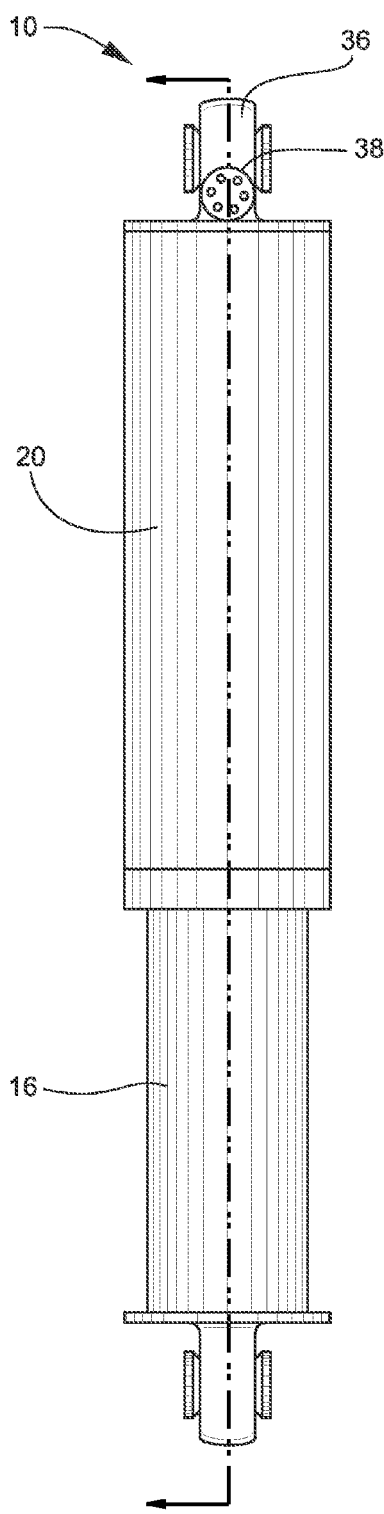
FIG. 3 is a side view of an air spring according to at least one embodiment of the instant invention.
Figure 4:
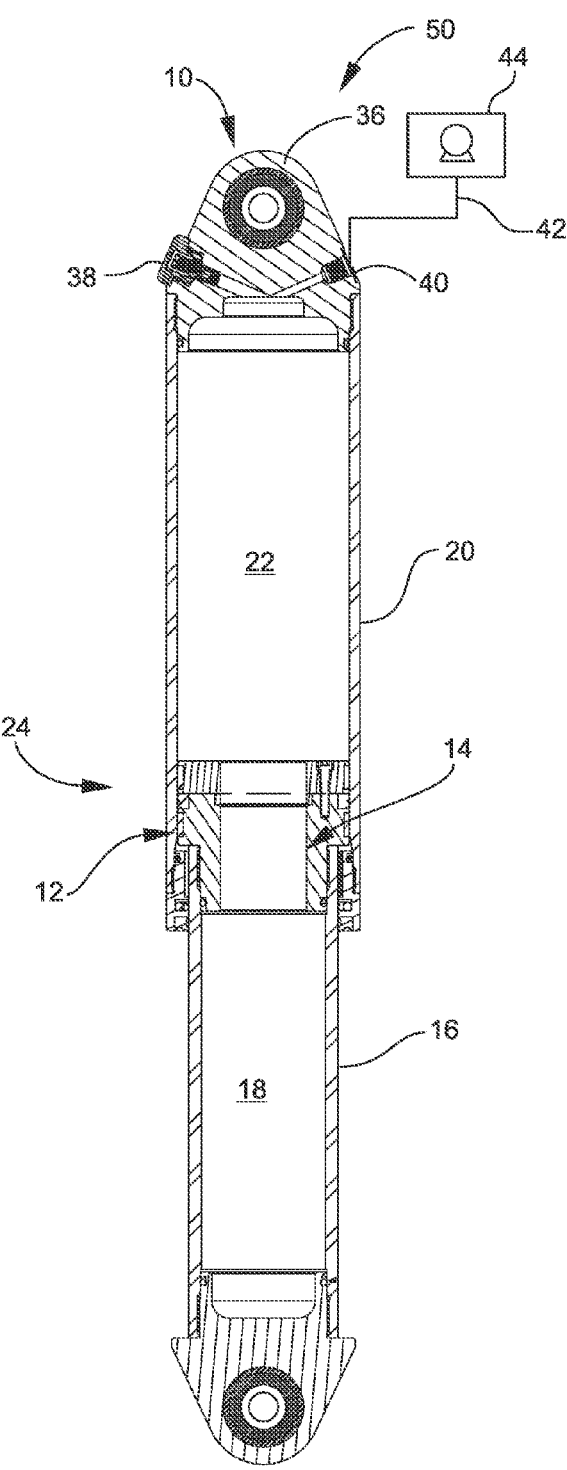
FIG. 4 is a cross-sectional view of the air spring from FIG. 3.
Figure 5:
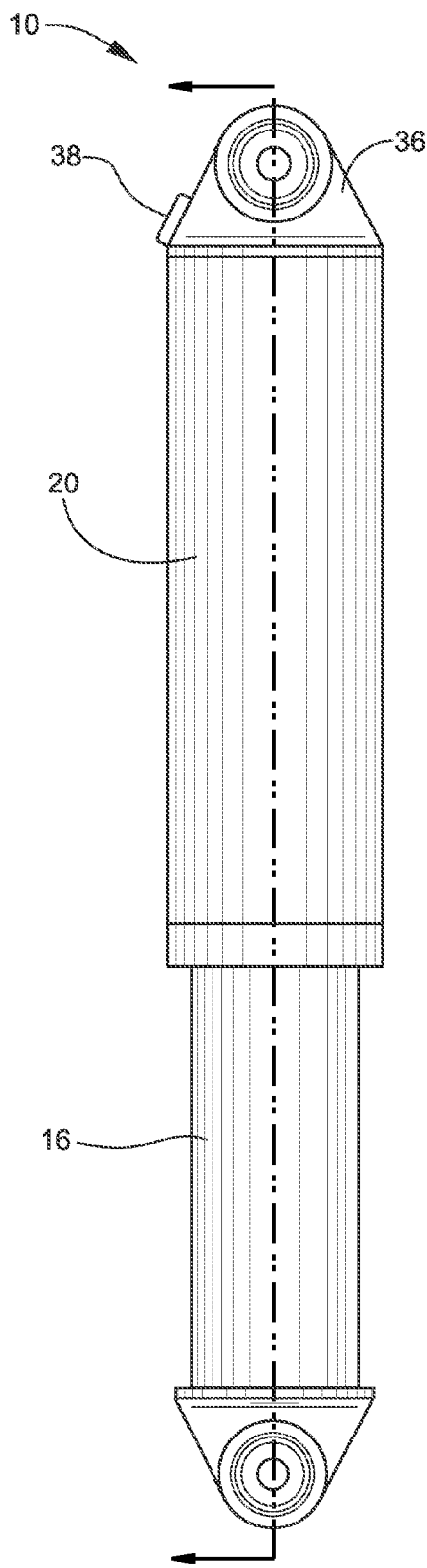
FIG. 5 is a side view of an air spring according to at least one embodiment of the instant invention.
Figure 6:
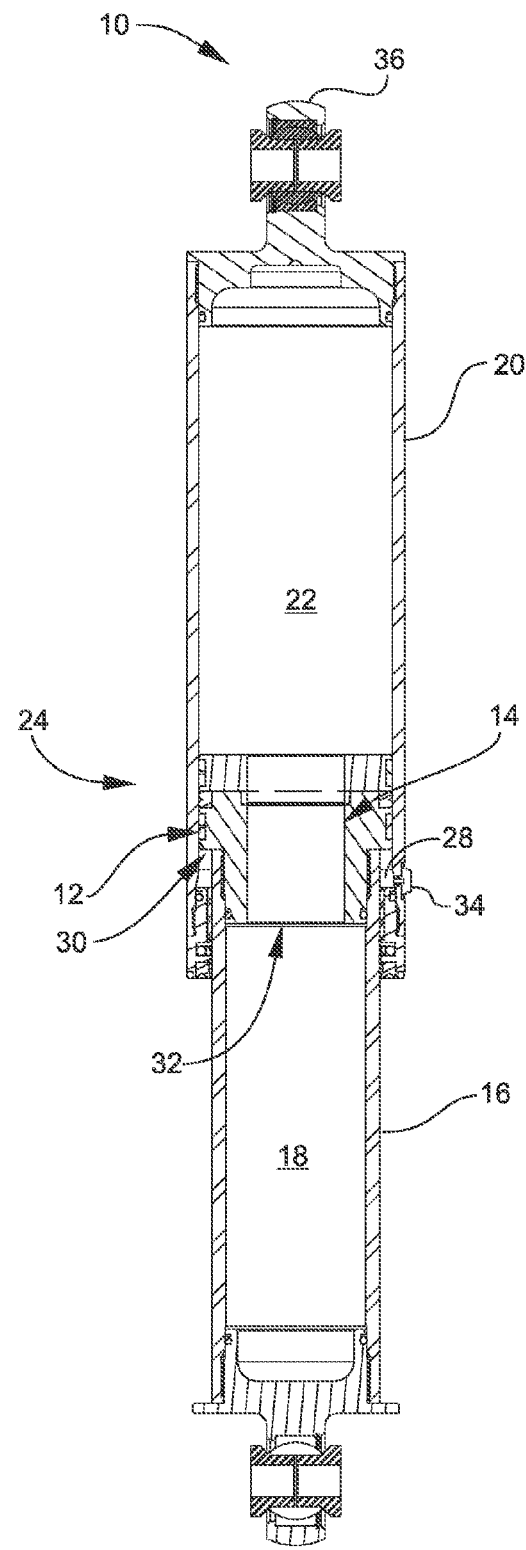
FIG. 6 is a cross-sectional view of the air spring from FIG. 5.
Figure 7:
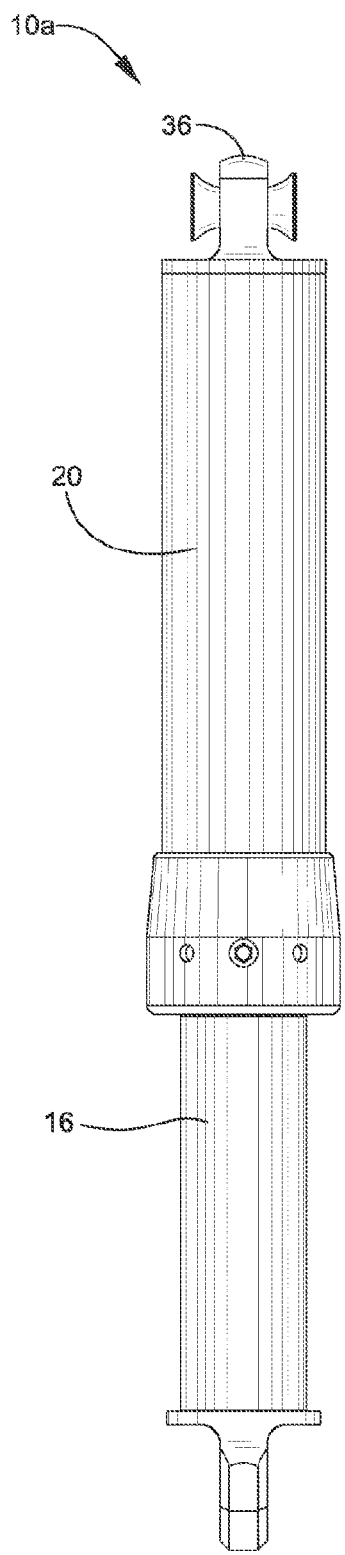
FIG. 7 is a side view of a dual air spring according to at least one embodiment of the instant invention.
Figure 8:
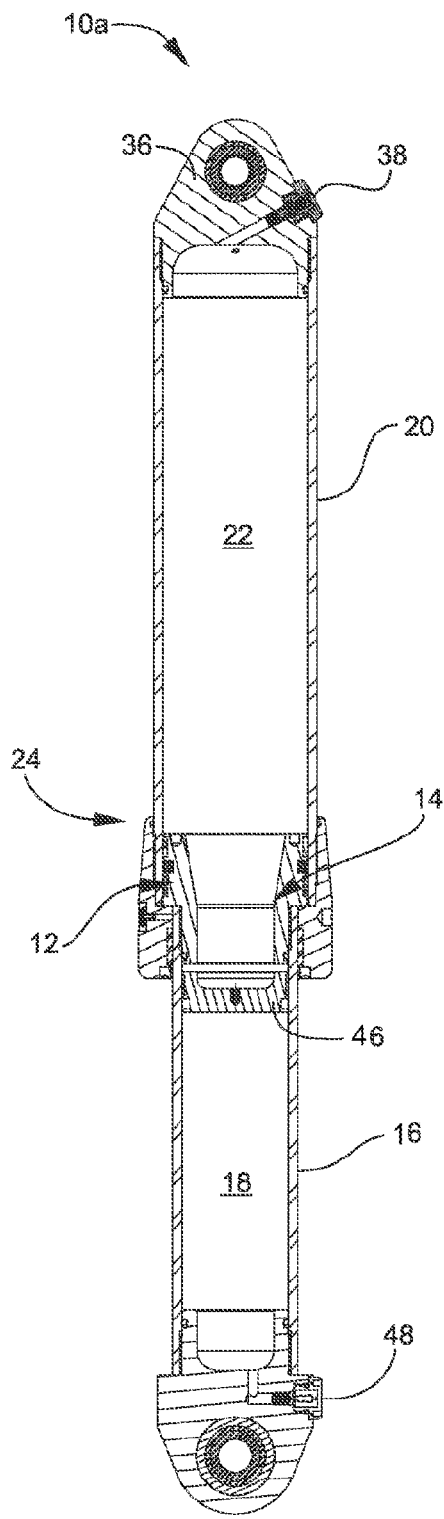
FIG. 8 is a cross-sectional view of the dual air spring from FIG. 7.

Referring to FIG. 1, prior to the instant invention the typical air spring has a relatively non-linear spring rate. This means that the force required to compress the air spring the first few inches of compression displacement is relatively the same, i.e. the spring rate remains pretty constant as shown between 500 lb/in and 1000 lb/in for the first 4 inches of compression displacement. Then, the force required to compress the spring grows exponentially the remaining distance of compression displacement as it grows from 1,000 lb/in to 12,000 lb/in for the compression displacement of 4 to 8 inches. This non-linear spring rate provided by standard air springs is not desired as it varies the ride of the vehicle under different loads. This is especially problematic for vehicles required to carry heavier loads like commercial and military vehicles, where the vehicle is carrying no loads in some instances, small loads in other instances, and larger heavy loads in other instances. As shown in FIG. 2, the instant invention provides a more linear spring rate than the prior art air springs and struts, i.e. the instant invention provides linearized spring rates 26 and 126.

In general, these linearized spring rates 26 and 126 may be provided with air spring 10 and air strut 100 by providing a hollow shaft and a piston with a hole through it that allows for communication of the shaft volume and body volume. This increase in the volume of the air spring may lead to more linearized spring rates 26 and 126. The details of the air spring 10 and the air strut 100 with linearized spring rates 26 and 126, respectively will be described in more detail below.

Referring to FIGS. 3-8, select embodiments of an air spring 10 is shown according to the instant invention. Air spring 10 may generally include: a hollow spring piston 12 having a spring hole 14 through it; and a hollow spring shaft 16 having a spring shaft interior volume 18 in communication with the spring hole 14 in the spring piston 12. The spring piston 12 may be a piston modified to be hollow with spring hole 14 through the middle of it. In one embodiment, spring piston 12 may be made from lower and upper piston portions, as shown in the Figures. However, the invention is not so limited, and spring piston 12 may be made from a single unit or multiple pieces. The air spring 10 may also have a spring body 20 with a spring body interior volume 22 in communication with the spring hole 14 in the hollow spring piston 12. The spring hole 14 in the hollow spring piston 12 may be in communication with the spring shaft interior volume 18 and the spring body interior volume 22 thereby providing a total spring interior volume 24 greater than just the spring body interior volume 22 (standard air spring). This total spring interior volume 24 may also include the volume of the spring hole 14 in the hollow piston 12. Thus, the purpose of spring hole 14 through the middle of spring piston 12 may be for increasing the volume of air spring 10 by adding the spring shaft interior volume 18 to the spring body interior volume 22. As shown in the comparison of the prior art spring rate of FIG. 1 versus the linearized spring rate 26 of the present invention, the present design of providing this total spring interior volume 24 which may be greater than the spring body interior volume 22 (prior art) may provide a more linear spring rate, i.e. a linearized spring rate 26.

A cavity 28 and a vent 34 may be included in select embodiments of the air spring 10. See FIG. 6. The vent 34 may be adapted to allow atmospheric air to enter the cavity thereby preventing a vacuum to be created when the air spring 10 compresses. The vent 34 may also be adapted to allow drawn in air to evacuate when the air spring 10 retracts. In one embodiment, the cavity 28 may be in the area on the non-pressurized side 32 of the piston seal 30.

A body cap 36 may be included in select embodiments of the air spring 10 of the instant invention. See FIGS. 3-6. The body cap 36 may provide the upper (as oriented in FIGS. 3-6) or lower attachment means for connecting the air spring to a suspension system. In addition, the body cap 36 may include a plurality of ports. In one embodiment, the body cap 36 may include a first port 38 being adapted for pressurizing and/or depressurizing the total spring interior volume 24 of the air spring 10. This first port 38 may be any size, type or shaped port. In one embodiment, the first port 38 in the body cap 36 may be a standard Schrader valve. In another embodiment, the body cap 36 may further have a second port 40. See FIG. 4. The second port 40 may also be any size, type or shaped port. In one embodiment, the second port 40 may be a straight thread port utilized to attach tube and hose fittings, like an SAE port. In one embodiment, the second port 40 may be adapted to be plugged whereby when the total interior volume 24 may be pressurized, the air spring 10 may act as a closed system thereby providing a constant load carrying capability and spring rate. In another embodiment, the second port 40 may be adapted to be attached to plumbing 42 for a ride height/spring rate adjustable system 44, whereby the ride height/spring rate adjustable system 44 may pressurize or depressurize the air spring 10 while on a vehicle.

The instant invention also contemplates an air spring suspension system 50 utilizing at least one air spring 10 as described above. See FIG. 4. The air spring suspension system 50 may be designed with any size or amount of air springs 10 according to the desires of the user and/or the vehicle or apparatus it is used on. In one embodiment, the air spring suspension system 50 may include the ride height/spring rate adjustable system 44 plumbed to the second port 40 for pressurizing or depressurizing the air spring while on a vehicle. As an example, this type of system may be utilized for allowing a vehicle required to carry heavier loads like commercial and military vehicles, to adjust the suspension system to accommodate different load amounts.

Figure 9:
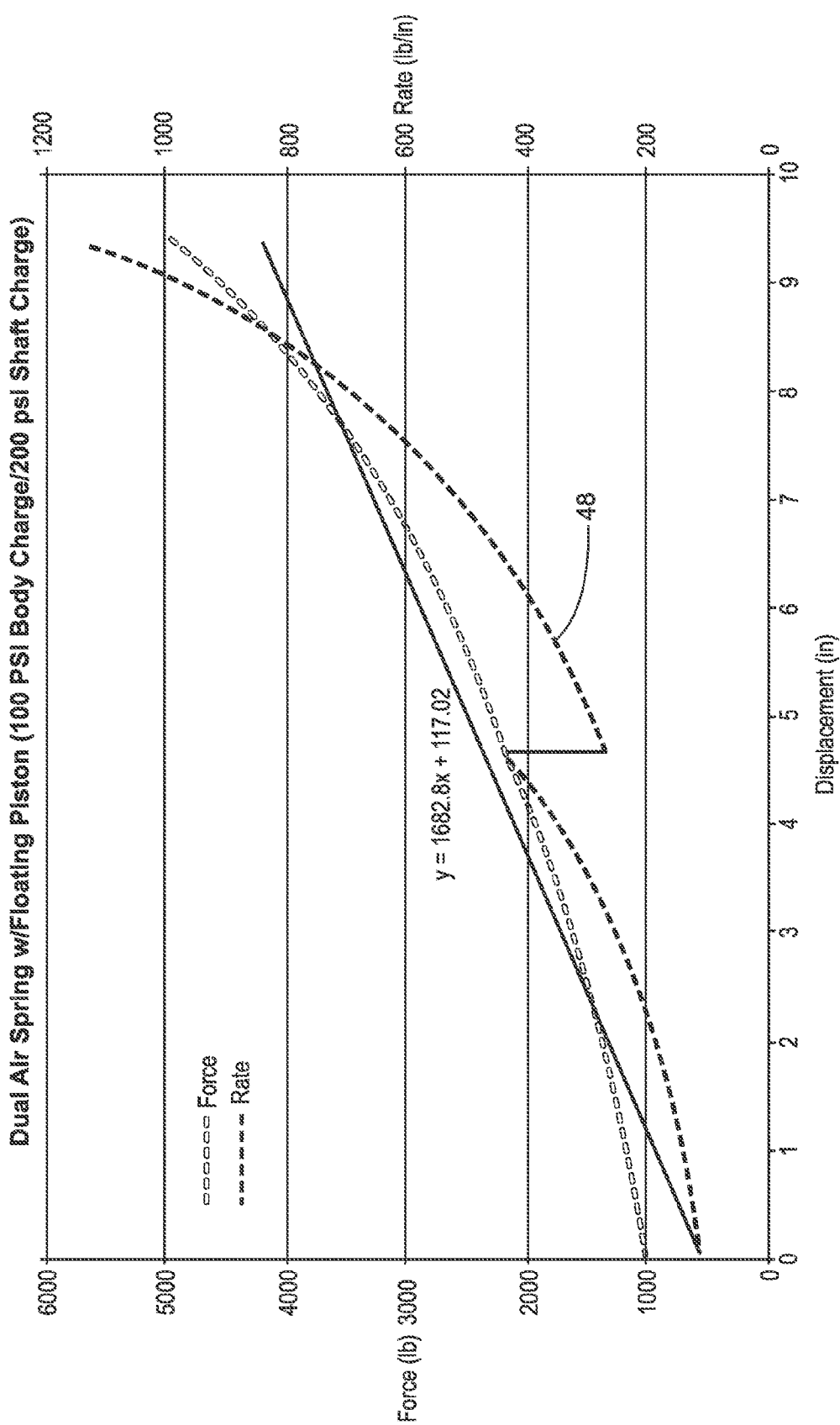
FIG. 9 is a graph of the dual spring rate of a dual air spring according to at least on embodiment of the instant invention in force versus displacement.
Figure 12:
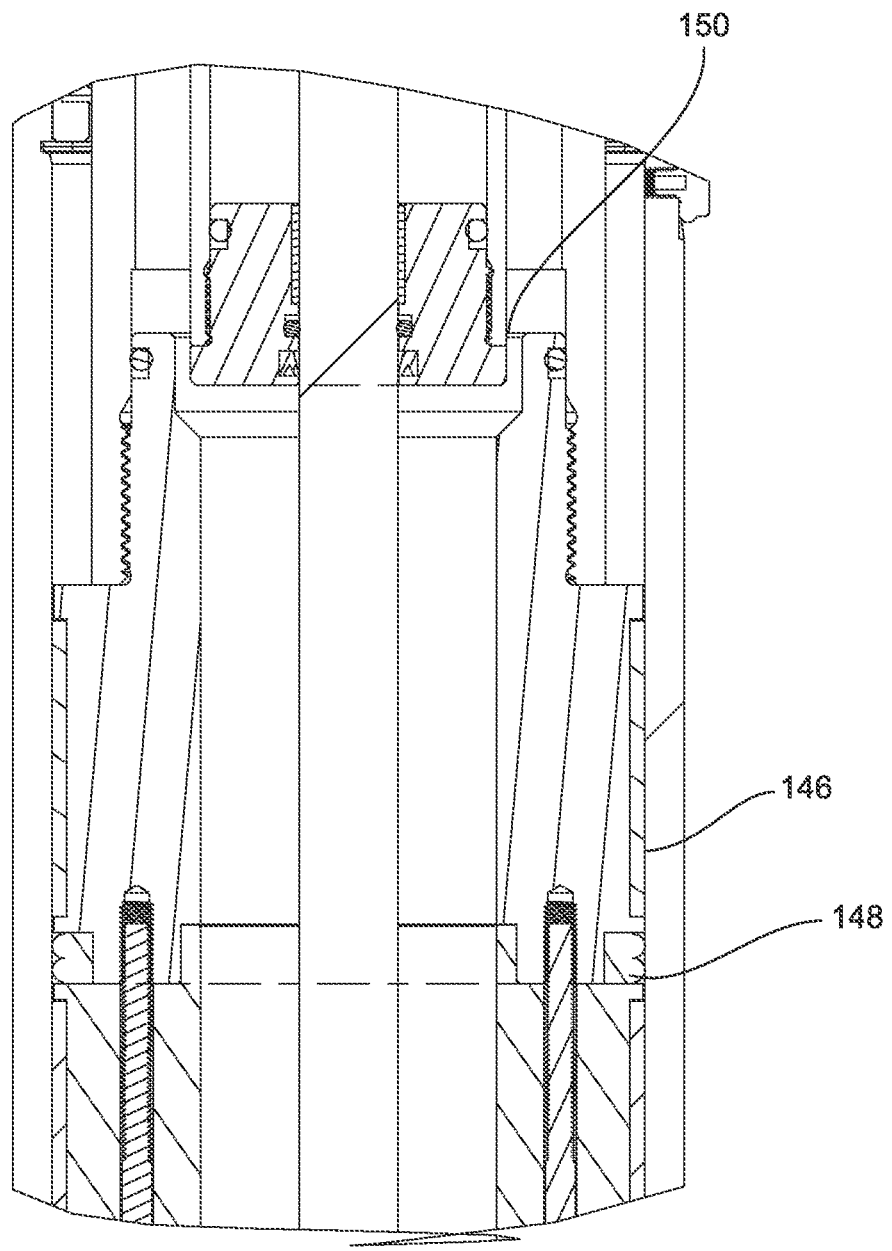
FIG. 12 is the zoomed in view labeled A from the cross-sectional view from FIG. 11 of the air strut from FIG. 10.
Figure 13:
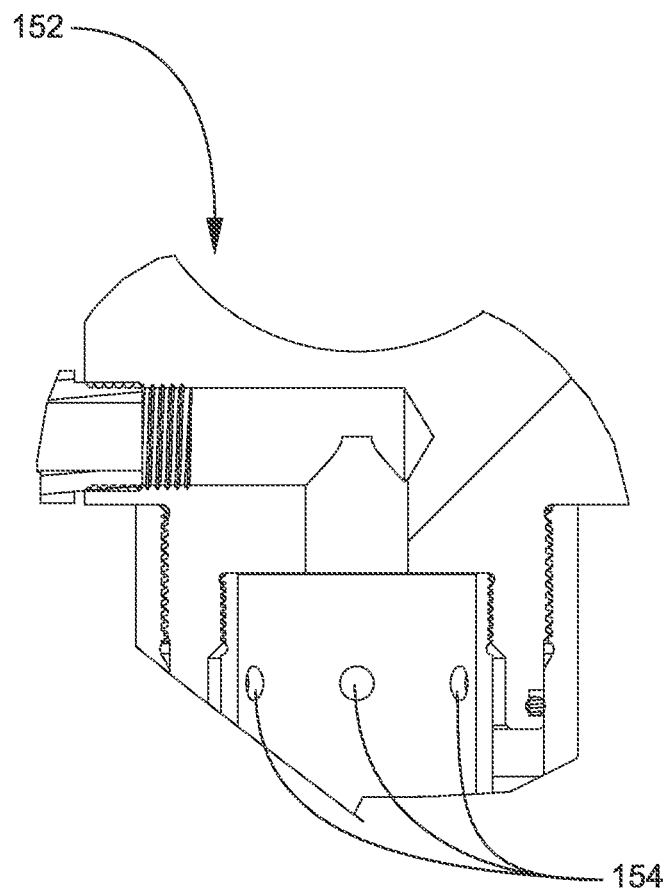
FIG. 13 is the zoomed in view labeled B from the cross-sectional view from FIG. 11 of the air strut from FIG. 10.
Figure 14:
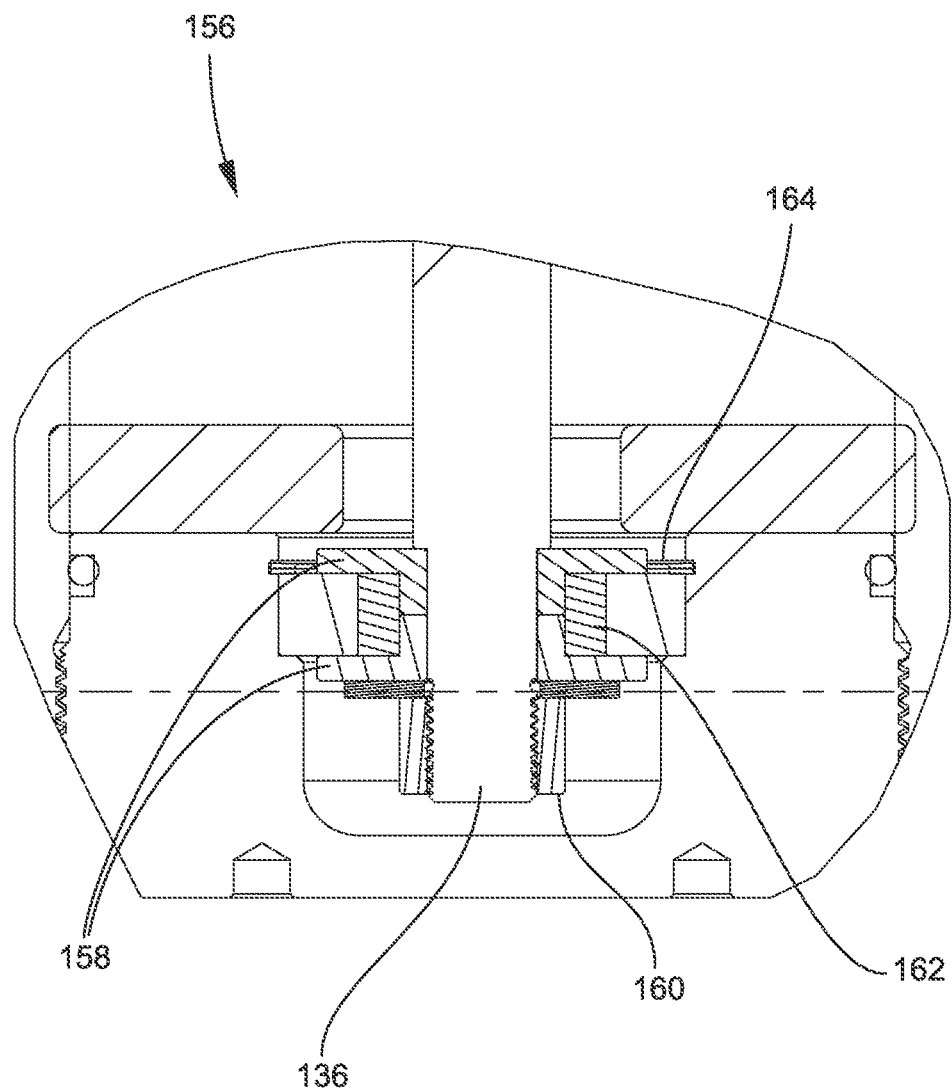
FIG. 14 is the zoomed in view labeled C from the cross-sectional view from FIG. 11 of the air strut from FIG. 10.

The instant invention also includes a dual air spring 10a. See FIGS. 7-9. The dual air spring 10a is similar to the air spring 10 described above and shown in FIGS. 2-6. The difference is that dual air spring 10a further includes a floating piston 46 positioned in the hollow spring shaft 16, and a dual spring port 48 in communication with the shaft interior volume 18. See FIG. 8. The basic function of the dual air spring 10a may also be the same as the standard air spring 10 discussed above. The difference being that the dual air spring 10a may provide a dual spring rate 49. With the dual air spring 10a, the body interior volume 22 can be charged to an initial first pressure via first port 38 and/or second port 40 in the body cap 36. The shaft interior volume 18 can then be charged to an initial second pressure via the dual spring port 48 in communication with the shaft interior volume 18. The initial second pressure, i.e. the shaft pressure, may be greater than the initial first pressure, i.e. the body pressure. As the dual air spring 10a may be compressed, the body interior volume 22 may be acted on and its pressure (first initial pressure) begins to rise. This initial rise (from 0 to approximately 4.5 inch displacement in FIG. 9) may be a spring rate that may be driven off the body interior volume only. However, eventually the body pressure equals the second initial pressure (shaft interior pressure) whereby the system volume now may become larger, as if the shaft interior volume 18 is added to the body interior volume 22, which results in a different spring rate (from approximately 4.5 and greater in FIG. 9). As shown in FIG. 9, the result is a dual spring rate 48.

Referring to FIGS. 10-14, the instant invention also includes an air strut 100. The air strut 100 may be designed to function as a MacPherson strut 128. MacPherson struts typically consist of a wishbone or a substantial compression link stabilized by a secondary link which provides a bottom mounting point for the hub or axle of the wheel, which provides both lateral and longitudinal forces on the wheel. The upper part of the hub is rigidly fixed to the inner part of the strut proper, the outer part of which extends upwards directly to a mounting in the body shell of the vehicle. Typical MacPherson struts may also have a steering arm built into the lower inner portion. These struts may carry both the coil spring on which the body is suspended and the shock absorber, which is usually in the form of a cartridge mounted within the strut. In order to function as a Macpherson type of strut 128, the air strut 100 may include many different components and features, as explained below.

The air strut 100 may be designed to include the concepts of the air spring 10 discussed above. As such, the air strut 100 may include: a hollow air strut piston 112 having a strut hole 114 through it; and a hollow strut shaft 116 having a shaft interior volume 118 in communication with the strut hole 114 in the strut piston 112. The strut piston 112 may be a piston modified to be hollow with strut hole 114 through the middle of it. In one embodiment, strut piston 112 may be made from lower, middle, and upper piston portions, as shown in the Figures. However, the invention is not so limited, and strut piston 112 may be made from a single unit, two pieces, or other multiple pieces. The air strut 100 may further include: a strut body 120 having a strut body interior volume 122 in communication with the strut hole 114 in the hollow strut piston 112. The strut hole 114 in the hollow strut piston 112 may be in communication with the strut shaft interior volume 118 and the strut body interior volume 122 thereby providing a total strut interior volume 124 greater than the strut body interior volume 122. The total strut interior volume 124 may further include the volume of the strut hole 114 in the hollow strut piston 112. The total interior strut volume 124 may be greater than the strut body interior volume 122 thereby providing a more linear strut spring rate 126 for air strut 100. See FIG. 2.

In one embodiment, the air strut 100 may include a reservoir 130 in communication with the total strut interior volume 124. The reservoir 130 may be for adding additional volume, thereby providing an air strut with a linearized strut spring rate 126. The reservoir 130 may add additional volume to replace the volume taken up by internal damper 132, as discussed below.

In one embodiment, the air strut 100 of the instant invention may further include an internal damper 132 housed within the strut shaft 116. The internal damper 132 be a standard damper housed within the strut shaft 116. In one embodiment, the internal damper 132 may have: a strut internal shock body 134 housed in the strut shaft 116; and a strut internal shock shaft 136 extending through the strut hole 114 in the air strut piston 112 and attaching to the end of the strut body 120. The internal damper 132 may be adapted for allowing the air strut 100 to provide damping characteristics to the vehicle, including, but not limited to, damping characteristics similar to a MacPherson strut.

A chassis attachment 138 may be included in select embodiments of the air strut 100 of the instant invention. See FIG. 11. The chassis attachment 138 may be located at the end of the strut shaft 116 on the top side of the air strut 100 (as oriented in the Figures). The chassis attachment 138 may be adapted to attach the strut shaft 116 to the chassis of a vehicle. The chassis attachment 138 may be any non-rigid type of chassis attachment. In one embodiment, the chassis attachment 138 may include a bearing housing 140. The lower end 142 of the air strut 100 may be adapted to attach to a knuckle of a wheel assembly. In one embodiment, chassis attachment 138 may allow air strut 100 to be attached to a vehicle similar to a MacPherson strut.

In order to function as a strut, like a MacPherson strut 128, in select embodiments of air strut 100 the air strut piston 112 may be adapted to allow the strut body 120 to rotate while continuing to seal pressure without leaking. See FIGS. 11 and 12. As examples, in select embodiments the air strut 100 may include: large wear bands 146 around the air strut piston 112 adapted to allow the strut to take on large side load forces; a piston seal 148 around the air strut piston 112; a clearance 150 for pressure passage around the hollow piston and shock body; or combinations thereof. In the embodiment shown in FIG. 12, the air strut 100 may include large wear bands 146, piston seal 148, and clearance 150.

A cross over passage 152 may be included in other select embodiments of air strut 100. See FIGS. 11 and 13. The cross over passage 152 may be adapted for allowing the pressure to act on the air strut piston 112 for spring rate, but also on the piston of internal damper 132 for shaft ingestion. The cross over passage 152 may be any size, type or shaped passage. In one embodiment, the cross over passage 152 may be a cross-over hole 154 or a plurality of cross-over holes 154 around the internal shock body 134. In possibly preferred embodiments, the cross over passage 152 may be sized as large as possible thereby reducing and/or eliminating any choking effects under high velocity compression strokes.

A movable mounting scheme 156 may be included in select embodiments of air strut 100. See FIGS. 11 and 14. The movable mounting scheme 156 may be adapted for connecting the strut internal shock shaft 136 to the end of the strut body 120. The movable mounting scheme 156 may prevent the strut internal shock shaft 136 from moving up and down from the end of the strut body 120 while allowing the strut internal shock shaft 136 to move left and right. This functioning of the movable mounting scheme 156 may allow the strut internal shock shaft 136 to move if there is any misalignment when the strut bends due to side loading without creating a side load on the internal damper. The movable mounting scheme 156 may be any type of movable mounting scheme providing this type of function for the air strut 100. In one embodiment, the movable mounting scheme 156 may include: two shock shaft spacers 158; a shaft nut 160; a flexible bushing 162; and a shock mount 164. The flexible bushing 162 may be any flexible bushing, including, but not limited to, a urethane bushing. The shock mount 164 may be any type of shock mount, including, but not limited to, an aluminum shock mount. In one embodiment, movable mounting scheme 156 may be designed to allow air strut 100 to function similar to a MacPherson strut.

The instant invention also contemplates an air strut suspension system 166 utilizing at least one air strut 100 as described above. See FIG. 11. The air strut suspension system 166 may be designed with any size or amount of air struts 100 according to the desires of the user and/or the vehicle or apparatus it is used on. In one embodiment, the air strut suspension system 166 may include the ride height/spring rate adjustable system 44 plumbed to the reservoir 130 for pressurizing or depressurizing the air strut 100 while on a vehicle. As an example, this type of system may be utilized for allowing a vehicle required to carry heavier loads like commercial and military vehicles, to adjust the suspension system to accommodate different load amounts.

Figure 15:
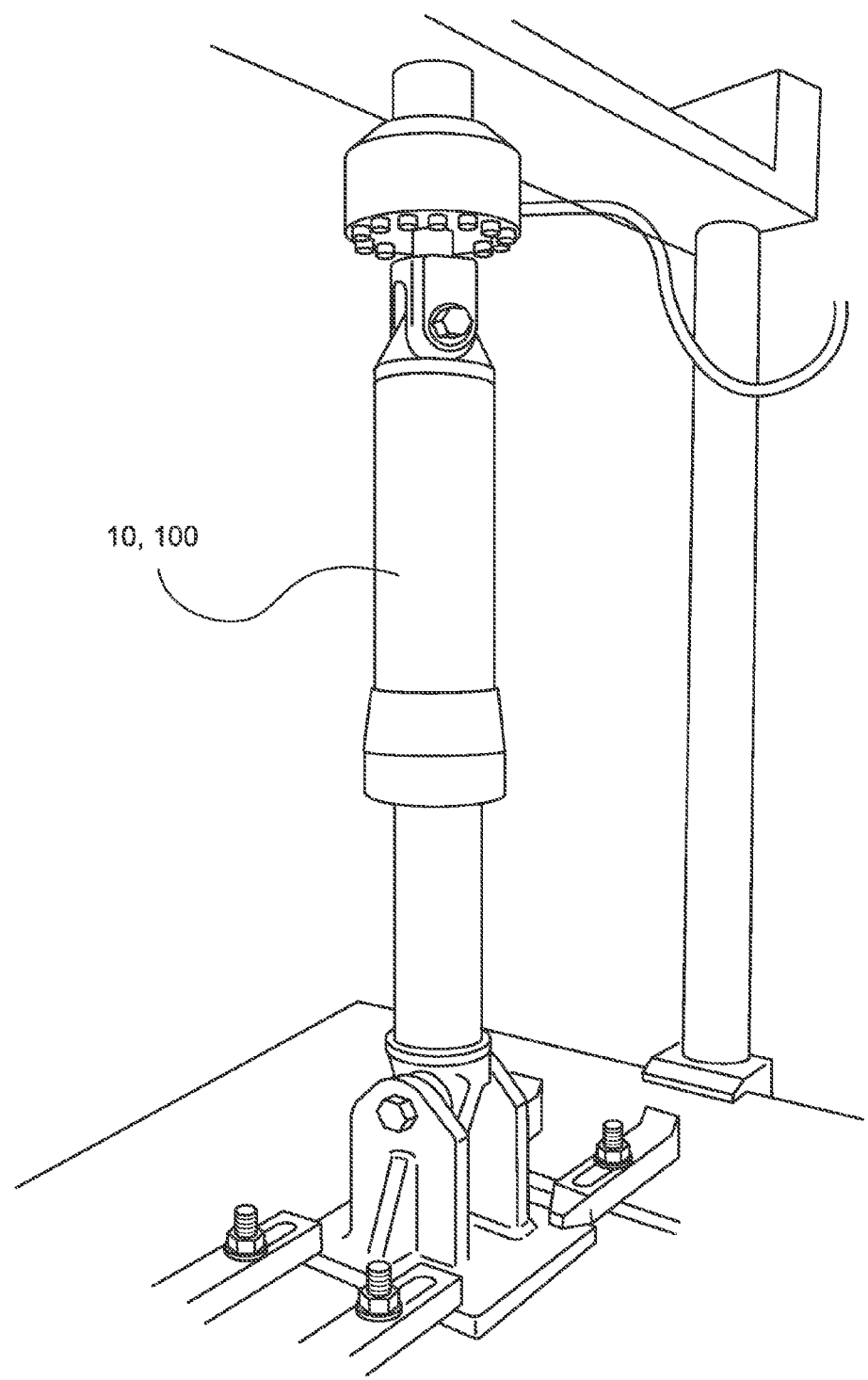
FIG. 15 is a perspective view of an air spring or strut from the instant invention being tested for spring rate.

Referring to FIG. 15, select embodiments of the air spring 10 and air strut 100 were mounted to testing equipment to determine the spring rate of the devices in force versus displacement. The results of such tests are shown in FIGS. 2 and 9 (dual air spring) which show a more linear spring rate than standard air springs (as shown in FIG. 1). For these comparisons, the same initial charge pressure was used. FIG. 2 shows that the instant invention provides a more linear spring rate, i.e. a linearized spring rate when compared to the prior art spring rates from FIG. 1.

The present invention may be embodied in other forms without departing from the spirit and the essential attributes thereof, and, accordingly, reference should be made to the appended claims, rather than to the foregoing specification, as indicated the scope of the invention.

We claim:

1. An air spring with a linearized spring rate comprising:
   a hollow spring piston having a spring hole through said hollow spring piston;
   a hollow spring shaft having a spring shaft interior volume in communication with said spring hole in said hollow spring piston; and
   a spring body having a spring body interior volume in communication with said spring hole in said hollow spring piston;
   said spring hole in said hollow spring piston is in direct communication with the entire spring shaft interior volume and with the entire spring body interior volume providing a total spring interior volume;
   wherein said total spring interior volume being greater than said spring body interior volume thereby providing a linearized spring rate.

2. The air spring according to claim 1, wherein said total spring interior volume further including a volume of said spring hole in said hollow spring piston.

3. The air spring according to claim 1 further comprising:
   a cavity in an area on a non-pressurized side of a spring piston seal; and
   a vent;
   whereby, said vent being adapted to allow atmospheric air to enter said cavity thereby preventing a vacuum to be created when the air spring compresses.

4. The air spring according to claim 3 wherein said vent also being adapted to allow drawn in air to evacuate when the air spring retracts.

5. The air spring according to claim 1 further comprising:
   a body cap having:
      a first port being adapted for pressurizing and depressurizing said total spring interior volume of said air spring.

6. The air spring according to claim 5 wherein said body cap further comprising a second port, said second port being adapted to either be:
   plugged whereby when said total spring interior volume is being pressurized, said air spring acting as a closed system thereby providing a constant load carrying capability and spring rate; or
   attached to plumbing for a ride height/spring rate adjustable system, whereby said ride height/spring rate adjustable system pressurizes or depressurizes the air spring while on a vehicle.

7. An air spring suspension system comprising:
   at least one air spring comprising: a hollow piston having a hole through said hollow piston;
   a hollow shaft having a shaft interior volume in communication with said hole in said hollow piston; and
   a body having a body interior volume in communication with said hole in said hollow piston;
   a body cap having:
   a first port being adapted for pressurizing and/or depressurizing a total interior volume of said air spring; and
   a second port being adapted to be plugged whereby when said total interior volume is being pressurized, said air spring acting as a closed system thereby providing a constant load carrying capability and spring rate said hole in said hollow piston in communication with said shaft interior volume and said body interior volume providing said total interior volume;
   wherein said total interior volume being greater than said body interior volume thereby providing a linearized spring rate.

8. The air spring suspension system according to claim 7 further comprising:
   a ride height/spring rate adjustable system being plumbed to said second port for pressurizing or depressurizing the air spring while on a vehicle.

9. A dual air spring with a linearized spring rate comprising:
   a hollow spring piston having a spring hole through said hollow spring piston;
   a hollow spring shaft having a spring shaft interior volume in communication with said spring hole in said hollow spring piston; and
   a spring body having a spring body interior volume in communication with said spring hole in said hollow spring piston; said spring hole in said hollow spring piston in communication with said spring shaft interior volume and said spring body interior volume providing a total spring interior volume;

a floating piston in said hollow spring shaft separating said spring body interior volume and said spring shaft interior volume; and a dual spring port in communication with said spring shaft interior volume;

wherein said total spring interior volume being greater than said spring body interior volume thereby providing a dual linearized spring rate.

10. The dual air spring of claim 9 wherein:

said spring body interior volume being charged to an initial first pressure;

said spring shaft interior volume being charged to an initial second pressure being greater than said first pressure;

whereby, when said dual air spring being initially compressed, said spring body interior volume being compressed thereby raising said first pressure and providing said dual air spring with an initial spring rate based on said spring body interior volume, and when said first pressure equals said second pressure, said dual air spring having a second spring rate based on said total spring interior volume.

11. An air spring with a linearized spring rate comprising:

a hollow spring piston having a spring hole through said hollow spring piston;

a hollow spring shaft having a spring shaft interior volume in communication with said spring hole in said hollow spring piston; and a spring body having a spring body interior volume in communication with said spring hole in said hollow spring piston;

said spring hole in said hollow spring piston in communication with said spring shaft interior volume and said spring body interior volume providing a total spring interior volume;

a cavity in an area on a non-pressurized side of a spring piston seal; and a vent;

whereby, said vent being adapted to allow atmospheric air to enter said cavity thereby preventing a vacuum to be created when the air spring compresses;

wherein said total spring interior volume being greater than said spring body interior volume thereby providing a spring linearized spring rate.

12. An air spring with a linearized spring rate comprising:

a hollow spring piston having a spring hole through said hollow spring piston;

a hollow spring shaft having a spring shaft interior volume in communication with said spring hole in said hollow spring piston; and a spring body having a spring body interior volume in communication with said spring hole in said hollow spring piston;

said spring hole in said hollow spring piston in communication with said spring shaft interior volume and said spring body interior volume providing a total spring interior volume;

a body cap having:
   a first port being adapted for pressurizing and depressurizing said total spring interior volume of said air spring;
   wherein said body cap further comprising a second port, said second port being adapted to either be:
      plugged whereby when said total spring interior volume is being pressurized, said air spring acting as a closed system thereby providing a constant load carrying capability and spring rate; or
      attached to plumbing for a ride height/spring rate adjustable system, whereby said ride height/spring rate adjustable system pressurizes or depressurizes the air spring while on a vehicle;

wherein said total spring interior volume being greater than said spring body interior volume thereby providing a spring linearized spring rate.

\* \* \* \* \*